March 11, 1969 R. K. SHELBY 3,432,640
INFRARED HEATING METHOD FOR MOLDING MACHINES AND THE LIKE
Original Filed Dec. 26, 1963
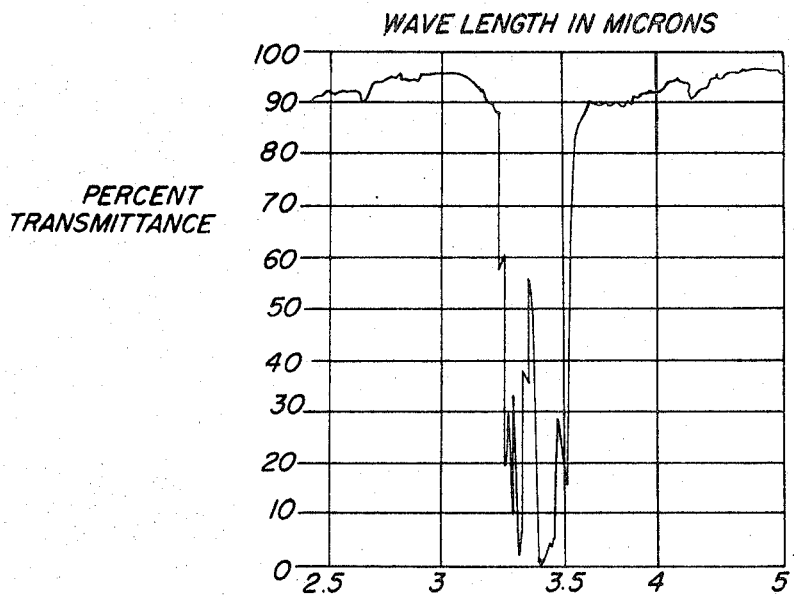
FIG. 6
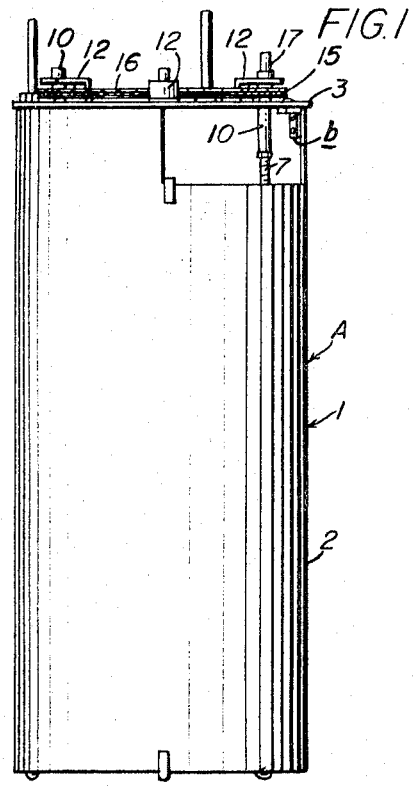
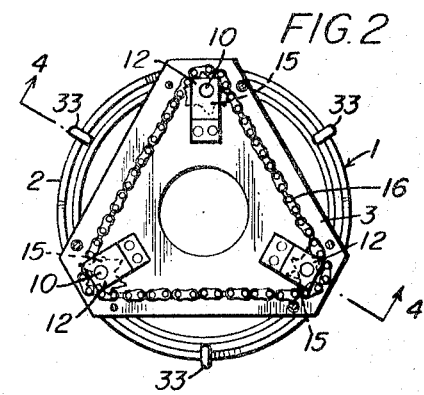
INVENTOR.
RICHARD K. SHELBY

INVENTOR.
RICHARD K. SHELBY 3,432,640
INFRARED HEATING METHOD FOR MOLDING MACHINES AND THE LIKE
Richard K. Shelby, Downers Grove, Ill., assignor to Monsanto Company, St. Louis, Mo., a corporation of Delaware
Original application Dec. 26, 1963, Ser. No. 333,508, now Patent No. 3,325,629, dated June 13, 1967. Divided and this application Jan. 20, 1967, Ser. No. 627,577
U.S. Cl. 219—354   6 Claims
Int. Cl. H05b 3/46

ABSTRACT OF THE DISCLOSURE

The method of heating sheets of thermoplastic material to a desired temperature range for molding operations where the sheet is passed beneath downwardly facing dish-shaped heaters located in individual housings where the web is heated by infrared radiation which has an intensity curve which peaks within the wave length range of 3.2 to 3.5 microns and where the thermoplastic material is a graft styrene-butadiene and a polystyrene combination.

---

Figure 4:
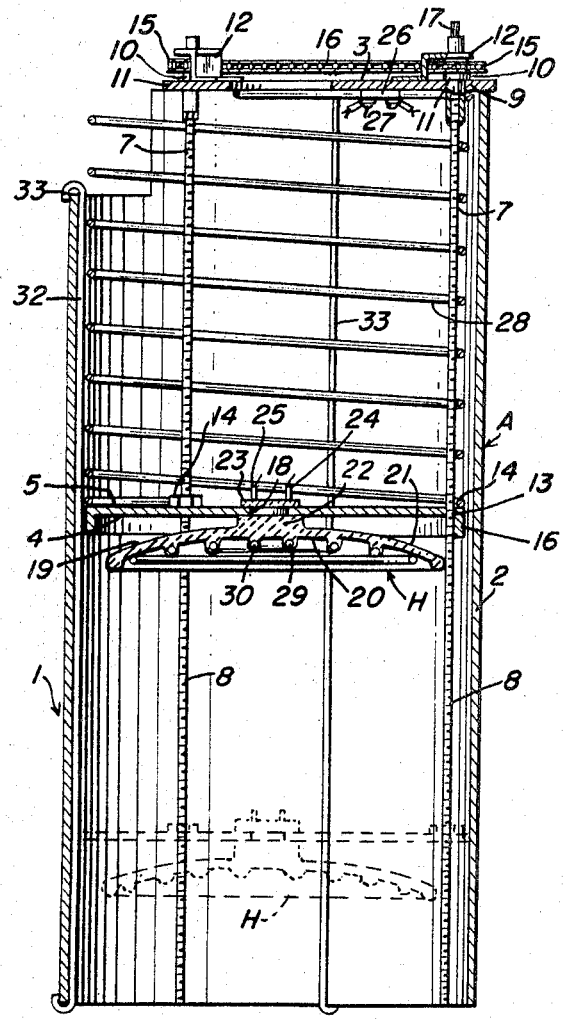

This application is a division of my copending application Ser. No. 333,508, filed Dec. 26, 1963, now U.S. Patent No. 3,325,629, issued June 13, 1967.

This invention relates in general to certain new and useful improvements in molding machines and more particularly to a heatig method for molding machines and the like.

Many container producers have, in the recent years, switched to the use of thermoformable materials as a material in the construction of thin-walled containers. This is especially true in the art of thin-walled disposable containers such as cups employed in vending machines and the like. Articles of this type have been mass produced by molding machines of the type described in U.S. Letters Patent No. 2,967,328. Machines of this type are adapted to form or mold plastic articles from a continuously traveling web of suitable thermoplastic material such as polystyrene or modified polystyrene. These materials readily yield and are easily formed when subjected to high temperatures.

In the molding machines of the type describd in the aforementioned patent, the web of thermoplastic material is normally preheated to a temperature somewhat below the point at which the material "flows" and becomes sufficiently flexible and moldable for forming. When these areas of the web which have been preheated to a temperature almost approaching the molding temperature, they are then formed. Normally, the dies are heated to bring the material contained therein up to the molding temperature. This perheating mechanism normally consists of banks of heating lamps or tubes that extend in a direction which is transverse to the movement of the thermoplastic web, and which are mounted in close proximity to the movable web.

This type of preheating apparatus has been rather ineffective for a number of reasons. It has been well established that the temperature of the material to be formed in the molding dies is a critical factor during the molding operation. If the temperature is too low, even material distribution is not attained in the finally molded article. If the temperature is too high, the material will flow improperly and again cause improper material distribution in the finally molded article. One of the most difficult problems with the heaters of the prior art is that these heaters were not designed to provide selected area heating. The heaters consisted of banks of tubes or lamps which extended transversely to the direction of movement of the web and heated the entire web as it passed beneath the lamps. It has been found desirable, however, to heat only those portions of the web which are ultimately molded in the cooperating dies and moveover, it is desirable to provide uniform heat distribution throughout the selected areas. However, it is not desirable to heat the remaining portions of the web which are not molded in the cooperating dies inasmuch as these remaining portions must serve as a supporting web which carries the finally molded articles until they are stripped from the web.

The heating mechanisms of the prior art were also ineffective in that they were not designed to emit radiation of proper wave length distribution which corresponds to the absorptivity of the thermoplastic material. In many cases, the thermoplastic material was not compatible to the emitted radiation from the heat source. Accordingly, a great deal of power was consumed to provide heat in a spectral distribution that was not effectively used and the efficiency of the operation was therefore materially reduced.

It is, therefore, the primary object of the present invention to provide a heating apparatus suitable for use in molding machines which are adapted to form thin-walled articles from continuously traveling webs of thermoplastic material.

It is another object of the present invention to provide a heating apparatus of the type stated which is designed to provide proper and uniform heat distribution in the areas of the thermoplastic sheets which are to be molded.

It is a further object of the present invention to provide a heating apparatus of the type stated which is designed to emit heat of a particular wave length of radiation so that a high percentage thereof is absorbable by the thermoplastic material.

It is an additional object of the present invention to provide a heating apparatus of the type stated which is highly efficient in its operation and is economical to operate.

It is another salient object of the present invention to provide suitable thermoplastic materials which are capable of being compatibly employed with the heating apparatus of the present invention.

With the above and other objects in view, my invention resides in the novel features of form, construction, arrangement and combination of parts and materials presently described and pointed out.

Figure 5:
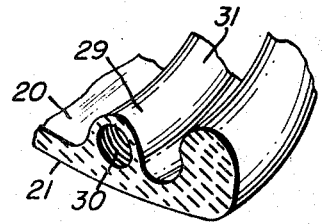
Figure 3:
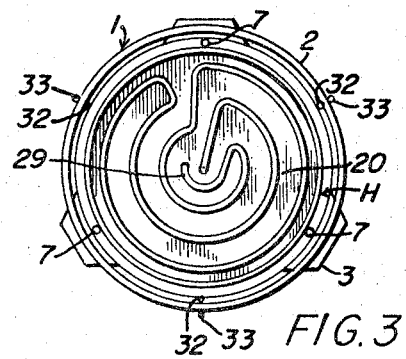

In the accompanying drawings:
FIGURE 1 is a side elevational view of a heating apparatus constructed in accordance with and embodying the present invention;
FIGURE 2 is a top plan view of the heating apparatus of FIGURE 1;
FIGURE 3 is a bottom plan view of the heating apparatus of FIGURE 1;
FIGURE 4 is a vertical sectional view taken along line 4—4 of FIGURE 2;
FIGURE 5 is a perspective view partly broken away and in section of a portion of the heater forming part of the heating apparatus of FIGURE 1; and
FIGURE 6 is a chart showing the plot of the percent of transmittance from the web of thermoplastic material as a function of the wave length in microns of the reflected radiation.

Generally speaking, the present invention provides a heating device which is suitable for use in molding machines of the type described in the U.S. Letters Patent No. 2,967,328 to R. K. Shelby et al. which operates on a principle of molding articles from a continuously traveling web of thermoplastic material. More particularly, the heating device of the present invention is designed to be mounted in banks of similar heating devices in the manner as described in my copending patent application Ser. No. 333,313, filed Dec. 26, 1963, now U.S. Patent No. 3,331,908, issued Aug. 1, 1967.

The heating device of the present invention generally comprises an outer housing having a mounting plate disposed therein. The housing is mounted in fixed relation to a moving web of thermoplastic material and is provided with a heater which is fixedly mounted on the plate. The housing is further provided with a mechanism for shifting the plate longitudinally within the housing and thereby vary the distance between the heater and the web of thermoplastic material.

The heater of the present invention is designed to emit radiation which has an intensity curve which peaks within the wave length range of 3.2 to 3.5 microns. The present invention also provides specific formulations of thermoplastic material which are suitable for use in molding machines of the type described and which are compatible with heating devices designed to emit radiation within this wave length range.

Referring now in more detail and by reference characters to the drawings which illustrate a preferred embodiment of the present invention, A designates a heating device comprising an outer housing 1, which is preferably formed of aluminum and is cylindrical in horizontal cross section. The housing preferably has a diameter of approximately 6″ and a length of approximately 20″ and is designed to be mounted in banks of similar heating devices A on a suitable heater supporting frame for heating a movable web of thermoplastic material illustrated and described in the aforementioned copending application Ser. No. 333,313, filed Dec. 26, 1963.

The outer housing consists of a cylindrical side wall 2, which is highly polished on its interior surface, thereby providing a suitable reflector surface. Rigidly secured to the upper margins of the cylindrical side wall 2 by means of three radially spaced L-shaped brackets b is a triangularly shaped support plate 3, substantially as shown in FIGURES 1 and 2. Disposed within the housing 1 and being shiftable therealong throughout its entire length is a heater mounting plate 4, which has a relatively flat horizontal wall 5, the latter integrally merging into a downwardly extending annular flange 6, which is slightly spaced from the interior surface of the cylindrical side wall 2.

Also mounted within the housing are three radially spaced lengthwise extending jack shafts 7. The jack shafts 7 terminate at their lower margins along a line which is substantially coincident upon the margin of the lower housing 1 and have an extended portion 8 which extends through apertures 9 formed within the support plate 3. All of the jack shafts 7 are provided with threaded sections throughout their entire length and are retained within the support plate 3 by means of diametrally enlarged heads 10 which are threadedly secured to the upper ends of the jack shafts 7 in the manner as shown in FIGURE 4. The heads 10 are provided with shoulders 11 and bear against the upper surface of the plate 3. The enlarged heads 10 also extend through support brackets 12, which are welded or otherwise rigidly secured to the upper surface of the support plate 3.

The jack shafts 7 also extend through apertures 13 formed within the heater mounting plate 4 and through nuts 14, which are spot welded or otherwise rigidly secured to the upper surface of the plate 4 in axial alignment with the shafts 7. Integrally formed with each of the enlarged heads 10 are horizontally aligned sprockets 15, and trained around each of the sprockets 15 is a continuous sprocket chain 16. One of the enlarged heads 10 has an upstanding rectangular upper end 17 for accommodating a conventional wrench (not shown) whereby this latter jack shaft can be rotated. As this latter named jack shaft is rotated, the sprocket chain 16 is rotated therewith and will rotate each of the other jack shafts 7 at the same rate of speed. As the jack shafts 7 rotate, the heater mounting plate 4 will be shifted within the housing 1. It can be seen, that the heater mounting plate 4 will be shifted evenly and will always be maintained in a parallel position with respect to the movable web of thermoplastic material through the above outlined construction.

The heater mounting plate 4 is provided with a centrally located aperture 18 for accommodating a heater H, the latter preferably being formed of a suitable ceramic material such as quartz, lime glass, low-alkali-content borosilicate glass available under the trademark Pyrex or high-silica, low expansion glass available under the trademark Vycor. In the present application, radiation which peaks within the wave length range of 3.2 to 3.5 microns is the most effective wave length range and for this range, fused quartz has been found to be most suitable. A heater having an outer casing made of fused quartz lends itself to spread the heat passing through the quartz layers and thereby enables greater uniformity of heat patterns. The radiation which normally passes from a heating element contained within the quartz formation penetrates the quartz and is diffused through air bubbles entrapped within the quartz formation. Quartz is also found to be most suitable inasmuch as the surface leakage of electricity is very small when compared to glass, porcelain and similar insulating materials. In fact, leakage is found to be about $6 \times 10^{-12}$ amp/cm. at 500 volts.

The heater H has an outer casing 19, which has an inverted dish-shaped vertical cross section, substantially as shown in FIGURE 4. By reference to FIGURE 4, it can be seen that the casing 19 is arcuately shaped having a downwardly presented concave bottom wall 20 and a matching top wall 21. By reference to FIGURE 3, it can be seen that the heater H is generally circular and has an upstanding mounting boss 22 integrally formed along its upper surface. Integrally formed with the mounting boss 22 is an upstanding T-shaped connector bracket 23, which is sized for insertion through the aperture 18 and for rigid securement to the plate 4. The connector bracket 23 is apertured to accommodate a pair of electrical terminal connectors 24, which are, in turn, connected to a connecting wire 25 disposed within the housing 1. The connecting wire 25 is connected to an insulated electrical adapter 26 mounted on the underside of the top plate 3 by means of screws 27 and is ultimately connected to a suitable source of electrical current (not shown). The connecting wire 25 is wound about a coil spring 28, which is disposed within the housing 1 and bears against the underside of the upper plate 3 and the upper surface of the plate 4 in the manner as shown in FIGURE 4. The heater H is integrally formed with a series of connecting channels 29 for accommodating a continuous coiled heater wire 30 or emitter which is ultimately connected to the electrical terminal connectors 24. By reference to FIGURES 3 and 5, it can be seen that the heater wire or emitter 30 is located in somewhat of an arcuate pattern having a series of convolutions. Moreover, by reference to FIGURE 4, it can be seen that the bottom wall 20 is integrally formed with protrusions 31, which form part of the channel 29 for retaining the heater wire 30.

The heater H is generally constructed so that it has an overall diameter of approximately 5″, and the arcuate bottom wall 20 is formed so that the approximate geometric center thereof is located at a height of ¼″ above a horizontal plane coincident with the peripheral margins of the casing 19. It can thus be seen that the heating wire 30 is mounted so that it is displaced from a horizontal plane coincident with the peripheral margin of the casing 19 at various distances. Naturally, the portion of the heater wire 30 along the peripheral margin is, in effect, substantially coincident with this horizontal plane whereas the portion of the heater wire 30 located at the geometric center of the bottom wall 20 is displaced by a height of approximately ¼″. Moreover, portions of the heater wire 30 which are located between the geometric center of the bottom wall 20 and the peripheral margin thereof, are displaced from the horizontal plane coincident with the peripheral margins of the casing 19 by a distance which is linearly proportional to the radial displacement from the peripheral margins. Accordingly, it can be seen that the portions of the heater wire 30 which are located at the geometric center of the casing 19 are displaced from the web of thermoplastic material by a marginally greater distance than the portion of the heater wire 30 which is located along the periphery of the bottom wall 20.

By means of the above outlined construction, it is possible to eliminate the tendency of the radiation to congregate and to cause local hot spots. It is well known that in heating elements and more particularly infrared heating elements, the heat has a tendency to concentrate or, in effect, focus itself upon the center of the area of the receiver which is being heated. As a result thereof, the center of this selected area has a higher temperaure than the outer margins. By displacing the heating wire 30 at the center of the casing 19, at a greater distance from the web than the portions of the heating wire 30 located along the periphery of the casing 19, the radiation which is directed upon the web is less concentrated. It should be noted in connection with the present invention, that a reflector is not required inasmuch as the interior surface of the housing 1 and the downwardly presented surface of the plate 4 is highly polished. These highly polished surfaces function as reflector surfaces and therefore obviate the need of a reflection element. However, the heater wire 30 should be designed to produce a temperature at which the radiation curve thereof would peak within the wave length range of from 3.2 to 3.5 microns.

In this connection it should be noted that the heater mounting plate 4 has a slightly smaller diametral size than the housing 1 so that it does not scratch the highly polished interior surface of the housing 1 as it shifts lengthwise therein. In order to prevent any surface contact, the housing 1 is provided with three annularly spaced guide wires 32 which extend for the length of the housing 1 along the interior surface thereof and are provided with reversely bent tabs 33, each of the latter being tacked or spot welded to the exterior surface of the housing 1.

It is also possible to optionally provide a transmitter which is designed to prevent transmission of radiation which is not contained within the wave length range of 3.2 to 3.5 microns. This transmitter, however, does not form the subject matter of this invention and is more fully described in copending application Ser. No. 333,468, filed Dec. 26, 1963. While the heater H of the present invention is considerably more effective than any device of the prior art when employed in molding machines of the aforementioned type, the efficiency of the heater is increased when employing a transmitter.

Each of the heaters H is designed to be individually controlled preferably through individual saturable reactors so that the heaters H may be energized either individually or in a plurality of units. The heating wire 30 is preferably formed of Nichrome or Chromel wire and preferably transmits its heat to the casing 19 through conduction. The power supplied to the heating wire 30 is designed to maintain an overall temperature of approximately 800° F.

The material from which the web is formed is a modified polystyrene, and is designed to have an absorbing coefficient which corresponds to the peak emissivity of the heater or heating wire 30 so that preferential absorptivity occurs in the range where the heater has its peak emissivity. The material found to be most suitable for use with the aforementioned heater H is a styrene-butadiene graft composition. The modified polystyrene material generally consists of approximately 94% polystyrene and approximately 5.0 to 6.0% of a styrene-butadiene rubber. Additionally, the composition of the present invention also contains approximately 2.0% of a mineral oil such as standard aliphatic white mineral oil such as the oil sold under the trademark Westol 35 from Penn Refining Company. The mineral oil of the present invention is designed to have a Saybolt viscosity within the range of 80 to 210 at a temperature of 70° F. While the styrene-butadiene rubber can be varied between 4.0% and 10.0%, the mineral oil can be varied between 0.5% and 3.0% with the polystyrene making up the remainder of the mixture.

The thermoradiation of the web which may be considered an opaque solid, is conveniently expressed as a function of its temperature and its emissivity. The emissivity in this case is the spectral emissivity, inasmuch as the radation over the entire spectral region from 3.2 to 3.5 microns is considered. When fused quartz is employed as the material to form the casing 19, and the aforementioned composition is employed, the heater H has an efficiency of approximately 53% at 1330° F. or 1000° K. Moreover, the heater H has approximately 5% of the radiation within the wave length range of 3.2 to 3.5 microns.

Through the above outlined combination of heater and modified polystyrene, it has been found that the amount of electrical power consumed in operating the heaters has been materially reduced. Moreover, the heaters are capable of being operated at a substantially reduced temperature since more of the radiation in the desired wave length range is being employed. Furthermore, the heaters are designed so that the composition of the modified polystyrene may be varied within limits without affecting the efficiency of the operation.

FIGURE 6 shows a typical transmission curve for the compositions of the present invention when used in combination with the heater H. This transmission curve measures the percent of transmittance as a function of the frequency of the radiation and as a function of the wave length of radiation in microns. It can be seen by reference to FIGURE 7 that a vast increase in the amount of infrared absorption was obtained within the wave length range of 3.2 to 3.5 microns and beyond that point the absorption was substantially reduced.

It should be understood that changes and modifications in the form, arrangement, construction, and combination of parts presently described and pointed out may be made and substituted for those herein shown without departing from the nature and principle of my invention.

Having thus described my invention what I desire to claim and secure by Letters Patent is:

1. The method of heating a sheet of thermoplastic material to a moldable temperature range which comprises passing the sheet of material into an ambient temperature atmosphere containing infrared radiation having peak emissivity within the wave length range of 3.2 to 3.5 microns and wherein the thermoplastic material comprises a polystyrene and a graft rubber styrene-butadiene combination having preferential absorptivity within said wave length range.

2. The method of heating a sheet of thermoplastic material to a moldable temperature range which said method comprises passing the sheet of material into an ambient temperature atmosphere containing infrared radiation having peak emissivity within the wave length range of 3.2 to 3.5 microns and wherein the thermoplastic material comprises polystyrene and a graft rubber styrene-butadiene combination and not more than 2% of a mineral oil, said material having preferential absorptivity within said wave length range.

3. The method of heating sheets of thermoplastic material by a heater located in an individual housing and having a heating element, said method comprising disposing said heater housing in spaced relation to said sheet of material, locating said heater with respect to said sheet of material so that the portions of the heating element which are located between the peripheral margin of the heater and the geometric center thereof are displaced from a plane coincident with the peripheral margin of the heater by a distance which is linearly proportional to the radial displacement from the peripheral margin of the heater, and energizing said heater so that it emits radiation having a peak emissivity within a wave length range of 3.2 to 3.5 microns to create an ambient temperature atmosphere containing said radiation, passing said sheet of material into said ambient temperature atmosphere and wherein the thermoplastic material comprises polystyrene and a graft rubber styrene-butadiene and a non-graft polybutadiene combination, said material having preferential absorptivity within the wave length range of 3.2 to 3.5 microns.

4. The method of heating sheets of thermoplastic material by a heater located in an individual housing and where the heater has an outer casing with an arcuately shaped concave wall facing said material and having a heating element therein, said method comprising disposing said heater housing in spaced relation to said sheet of material, the heating element having a series of spirally shaped convolutions which are conically located in said casing so the convolutions are further displaced from the material as the diameter thereof decreases, locating said heater so that the convolutions thereof face said sheet so that the portions of the heating element which are located between the peripheral margin of the heater and the geometric center thereof are displaced from a plane coincident with the peripheral margin of the heater by a distance which is linearly proportional to the radial displacement from the peripheral margin of the heater.

5. The method of claim 4 further characterized in that said heater emits radiation having peak emissivity within a wave length range of 3.2 to 3.5 microns.

6. The method of claim 5 further characterized in that said method comprises passing the sheet of material into an ambient temperature atmosphere containing infrared radiation having peak emissivity within the wave length range of 3.2 to 3.5 microns and wherein the thermoplastic material comprises polystyrene and a graft rubber styrene-butadiene combination, said material having preferential absorptivity within said wave length range.

References Cited

UNITED STATES PATENTS 3,041,669  7/1962  Marshall et al.
3,045,100  7/1962  Mills _____ 219—354

RICHARD M. WOOD, *Primary Examiner.*

R. F. STAUBLY, *Assistant Examiner.*

U.S. Cl. X.R.

219—348, 553; 250—85; 350—1